US004001653B2

United States Statutory Invention Registration [19]

[11] Reg. Number: H1653

France et al.

[45] Published: Jun. 3, 1997

[54] HIGH ACTIVE ENZYME GRANULATES

[75] Inventors: Paul A. R. G. France, Kessl; Andre C. Baeck, Bonheiden; Jose L. Vega, Strombeek-Bever, all of Belgium

[73] Assignee: The Procter & Gamble Company, Cincinnati, Ohio

[21] Appl. No.: 507,354

[30] Foreign Application Priority Data

Feb. 26, 1993 [EP] European Pat. Off. ..... 93870035

[51] Int. Cl.[6] ..... C11D 3/386

[52] U.S. Cl. ..... 510/320

[58] Field of Search ..... 252/174.12, DIG. 12, 252/173, 90; 510/392, 530

[56] References Cited

U.S. PATENT DOCUMENTS

| | | | |
|---|---|---|---|
| 4,219,436 | 8/1980 | Gromer et al. | 252/135 |
| 4,406,808 | 9/1983 | Gangwisch et al. | 252/91 |
| 4,652,391 | 3/1987 | Balk | 252/99 |
| 4,740,469 | 4/1988 | Nishinaka | 435/187 |
| 4,869,843 | 9/1989 | Saito et al. | 252/135 |
| 4,992,198 | 2/1991 | Nebashi et al. | 252/174.11 |
| 4,999,138 | 3/1991 | Nebashi et al. | 252/543 |
| 5,009,804 | 4/1991 | Clayton et al. | 252/90 |
| 5,178,798 | 1/1993 | Jolicoeur | 252/553 |
| 5,259,981 | 11/1993 | Chapple et al. | 252/95 |
| 5,312,557 | 5/1994 | Onda et al. | 252/99 |

FOREIGN PATENT DOCUMENTS

| | | | |
|---|---|---|---|
| 304332 | 2/1989 | European Pat. Off. | C11D 3/386 |
| 368589 | 5/1990 | European Pat. Off. | C11D 3/386 |
| 381397 | 8/1990 | European Pat. Off. | C11D 3/386 |
| 425277 | 5/1991 | European Pat. Off. | C11D 17/06 |
| 495257 | 7/1992 | European Pat. Off. | C11D 3/386 |
| 63-69894 | 3/1988 | Japan . | |
| WO91/09941 | 7/1991 | WIPO | C12N 9/00 |
| WO92/13054 | 8/1992 | WIPO | C11D 1/02 |
| 9419444 | 9/1994 | WIPO . | |

*Primary Examiner*—Charles T. Jordan
*Assistant Examiner*—Meena Chelliah

[57] ABSTRACT

The invention concerns the use of a concentrated granular detergent composition having a density of about 800 g/L or more comprising enzyme granulates characterized in that said enzyme granulates are present at a level of less than 20 g/L detergent composition, wherein said enzyme granulates have no negative impact on the whiteness of the detergent composition. Furthermore the invention relates to a concentrated granular detergent enzyme granulates characterized in that the concentration of high alkaline protease in the enzyme granulate is at least 2%.

3 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH ACTIVE ENZYME GRANULATES

Recently there has been considerable interest within the detergent industry in the production of detergent powders having relatively high bulk density, for example 600 g/liter and more. Also consumers and sale centers prefer highly concentrated detergent powder compositions. Furthermore the need for detergent compositions which exhibit not only good cleaning properties, but also good fabric-softening performance, and other fabric care benefits, is well-established in the art. The new generation of detergent compositions is now being marketed, which can be best pictured as "compact detergents". These so-called compact detergents have been given a variety of trade names such as "Ultra", "Supra", "Micro" etc. The particularity of such detergent compositions is their relatively high density compared to conventional detergent compositions, and their ability to achieve the same efficiency than conventional detergent compositions by using a considerably lesser amount of "compact" detergent composition. This particularity is best reflected, in terms of composition, by a relatively low amount of inorganic filler salt. The efficiency of such "compact" detergent compositions is best achieved by eliminating the pre-wash cycle and by using dispersing and diffusing devices, which are put directly in the drum of the washing machine at the start of the main washing cycle.

The trends, begun in the last four years, are coming along in the detergents industry with environmentalism and concentrated detergents going hand in hand.

Some advantages of concentrated detergents powder compositions are:

a. smaller containers or packs provide easier handling b. smaller packs create space for placing more packs per unit space c. less packing material which is advantageous to the environment In order to achieve smaller packs with concentrated powdered detergents in principle the following possibilities exist:

a. using more active components b. avoiding non-functional ingredients c. minimizing the amount of air in the packet Essential ingredients in the formulation of today's heavy duty detergent compositions are:

a. surface-active agents b. builders c. enzymes d. bleaching agents

The specific description of these components can be found hereafter.

In addition to above-mentioned ingredients the detergent composition may also contain optical whitening agents, anti-redeposition agents, polycarboxylate polymers, stabilizers, anti-oxidants, sud-suppressors, perfume and the like.

Concentrated detergent powder compositions are described for instance in EP 340,013 (Unilever) and EP 509,787 (Unilever).

In EP 340,013 is disclosed a granular detergent composition which is preferably free of phosphate builders, having a bulk density of at least 650 g/liter and comprises a) from 17 to 35 wt % of non-soap detergent-active material (consisting at least partially of anionic detergent-active material ) and b) from 28 to 45 wt % (anhydrous basis) of crystalline or amorphous sodium aluminosilicate, the weight ratio of (b) to (a) being from 0.9:1 to 2.6:1. The particle porosity is preferably less than 0.20. The composition may be prepared by granulation and densification in a high-speed mixer/granulator.

In EP 509,787 is disclosed concentrated detergent powder compositions having a bulk density of above 600 g/l, preferably at least 610 g/l, more preferably around 850 g/l as shown in Examples III–VII, and comprising a surfactant, a detergency builder, enzymes, a peroxygen compound bleach, and specific manganese complex as effective bleach catalyst. Use of these catalysts can make the detergent powder more compact, i.e. reduce the pack volume.

Since nowadays powder detergent compositions are getting more and more concentrated and more compact, as described in the two above-mentioned publications, this results in much lower recommended usages (gram detergent/wash) than with non-compact or medium-compact detergent compositions. However, at the same time the lower product usage has to deliver at least the same wash performance. As a consequence thereof, the level in finished product for some of the ingredients, especially for the enzymes used, has to be drastically increased without losing performance.

The amount of enzyme described in both mentioned applications is substantial. For instance in EP 509,787 the amount of proteolytic enzymes used, vary from 0.001% to 10% by weight, but preferably from 0.01% to 5% by weight, depending upon their activity.

The technical problem with these amounts in the finished compact products is how to circumvent the negative impact of the enzyme granulates on the whiteness of the detergent composition. Such a clearly negative impact on the whiteness of the detergent composition has never been distinguished in the prior art.

The more concentrated the compact compositon will be hence the lower the recommended usage, the more enzyme granulate has to be added in order to achieve the same wash performance. However higher levels of enzyme granulates have a clearly negative impact on the whiteness of the finished product as illustrated hereafter.

In order to show that using the same volume level, the amount of granulates needed comprising an enzyme has to be increased the following comparison is made between NON-compact, MEDIUM-compact and HIGH-compact density powders.

| NON compact detergent | Compact MEDIUM density | Compact HIGH density |
|---|---|---|
| d = 600 g/L recommended usage: 180 g/wash | d = 700 g/L recommended usage: 126 g/wash | d = 850 g/L recommended usage: 95 g/wash |

To keep the protease concentration/L wash liquor constant, the following is required for finished products when applying e.g. Savinase 4T granulates:

| Savinase 4T | | |
|---|---|---|
| 1 g/100 g detergent | 1.4 g/100 g detergent | 1.9 g/100 g detergent |

OR: expressed in g enzyme granulates/L detergent composition:

| 6 g/L detergent | 9.8 g/L detergent | 15.8 g/L detergent |
|---|---|---|

This clearly illustrates how, on an equal volume basis, the level of enzyme granulates has been increased by a factor 2.6× when moving from "fluffy" to very compact detergents ( d at least equal to 800). But also within the segment of compact detergents, increasing the density from 700 to 800 and higher and at the same time reducing the recommended usage from 126 to 95 g/wash requires an increase of 1.6× in the level of enzyme granulates/L detergent composition.

The following table with Hunter L,a,b values visualizes the huge difference in whiteness between enzyme granulates and detergent, hence indicating the clearly negative impact of the enzyme granulates on the whiteness of the detergent composition:

| | Savinase 4T | Savinase 10T | reference compact detergent (d = 850) |
|---|---|---|---|
| L | 73.8 | 71.3 | 88.0 |
| a | 2.1 | 1.5 | 1.7 |
| b | 3.8 | 1.6 | −1.6 |
| Whiteness (**) | 62.4 | 66.5 | 92.8 |

(**) Whiteness = L.-3b

The solution to above-mentioned problem is to use high active enzyme granulates revealing that the negative impact on the physical appearance of the detergent powder is no longer noticeable. In order to keep the above-recognized negative impact on whiteness below the perceivable threshold it is necessary according to our invention to limit the level of enzyme granulates in powder detergent composition with a density of about 800 g/L and more preferably at least 850 g/L to a maximum of 20 g per liter detergent composition. Preferably the level of enzyme granulates/L detergent composition is 15 g/L detergent composition, whereas the most preferred level of enzyme granulates/L detergent composition is 10 g/L detergent composition.

The term "level of enzyme granulates" used herein refers to the sum of enzymes used in detergents i.e. proteases, lipases, amylases, cellulases, peroxidases, oxidases, etc. This also includes single enzyme granulates and mixtures of single enzyme granulates as well as so-called co-prills (e.g. protease plus lipase in one single prill).

The term "high active enzyme granulate" means that an enzyme is incorporated in the form of granules or so-called prills, in an amount such that the final detergent composition has a high enzymatic activity per liter of final product. When applying high alkaline proteases, e.g. SAVINASE™, MAXACAL™, OPTICLEAN™, DURAZYM™ or MAXAPEM™ etc, the concentration of protease in the granulate has to be 2% or higher. Preferred examples are the protease granulates Savinase 8T and Savinase 10T, wherein for instance Savinase 8T means 8 KNPU/g as 8 kilo Novo protease units per gram of granulate. Savinase TM has a specific activity of 395 KNPU/g.

According to our invention, a further improvement is obtained by adding an extra amount of whitener, e.g. TiO2 to the preferred enzyme granulates. As a result thereof the Hunter L, a, b values (for using Savinase 10T) are 78.9, 0.0 and −0.01 respectively. The whiteness (L-3b) is therefore expressed as 78.9.

An additional advantage using high active enzymes as described above is that the overall level of TiO2 in the finished product is much lower. For instance in high active enzyme granulates the TiO2 amount is 9.1% versus 5.2% for the low active enzyme granulates by which the percentage TiO2 in the finished product is 0.094% vs. 0.155%.

So substantial less TiO2 can be used in order to obtain the same whiteness effect of the enzyme granulates. Using dyed enzyme granulates, like green and/or blue coloured granulates even the addition of the current low level of TiO2 can be further decreased or even omitted.

The detergent composition of the invention may be formulated in any convenient form, preferably as a powder. Detergent compositions of the invention may contain as above-mentioned other detergent ingredients known in the art as e.g. builders, bleaching agents, bleach activators, anti soil redeposition agents, perfumes, etc.

Additionally detergent compositions comprise surfactants which may be of the anionic, non-ionic, amphoteric, cationic or zwitteronic type as well as mixtures of these types.

A typical listing of these surfactants is given in U.S. Pat. No. 3,664,961 issued to Norris on May 23, 1972.

Mixtures of anionic surfactants are particularly suitable herein, especially mixtures of sulphonate and sulphate surfactants in a weight ratio of from 5:1 to 1:2, preferably from 3:1 to 2:3, more preferably from 3:1 to 1:1. Preferred sulphonates include alkyl benzene sulphonates having from 9 to 15, especially 11 to 13 carbon atoms in the alkyl radical, and alpha-sulphonated methyl fatty acid esters in which the fatty acid is derived from a $C_{12}$–$C_{18}$ fatty source preferably from a $C_{16}$–$C_{18}$ fatty source. In each instance the cation is an alkali metal, preferably sodium. Preferred sulphate surfactants are alkyl sulphates having from 12 to 18 carbon atoms in the alkyl radical, optionally in admixture with ethoxy sulphates having from 10 to 20, preferably 10 to 16 carbon atoms in the alkyl radical and an average degree of ethoxylation of 1 to 6. Examples of preferred alkyl sulphates herein are tallow alkyl sulphate, coconut alkyl sulphate, and $C_{14-15}$ alkyl sulphates. An example of a preferred ethoxy sulphate is the so-called AE3S ($C_{12-15}$ alkyl 3 times ethoxylated sulphate). The cation in each instance is again an alkali metal cation, preferably sodium.

One class of nonionic surfactants useful in the present invention are condensates of ethylene oxide with a hydrophobic moiety to provide a surfactant having an average hydrophilic-lipophilic balance (HLB) in the range from 8 to 17, preferably from 9.5 to 13.5, more preferably from 10 to 12.5. The hydrophobic (lipophilic) moiety may be aliphatic or aromatic in nature and the length of the polyoxyethylene group which is condensed with any particular hydrophobic group can be readily adjusted to yield a water-soluble compound having the desired degree of balance between hydrophilic and hydrophobic elements.

Especially preferred nonionic surfactants of this type are the $C_9$–$C_{15}$ primary alcohol ethoxylates containing 3–8 moles of ethylene oxide per mole of alcohol, particularly the $C_{14}$–$C_{15}$ primary alcohols containing 6–8 moles of ethylene oxide per mole of alcohol and the $C_{12}$–$C_{14}$ primary alcohols containing 3–5 moles of ethylene oxide per mole of alcohol.

Another class of nonionic surfactants comprises alkyl polyglucoside compounds of general formula $$RO(C_nH_{2n}O)_tZ_x$$

wherein Z is a moiety derived from glucose; R is a saturated hydrophobic alkyl group that contains from 12 to 18 carbon atoms; t is from 0 to 10 and n is 2 or 3; x is from 1.3 to 4, the compounds including less than 10% unreacted fatty alcohol and less than 50% short chain alkyl polyglucosides. Compounds of this type and their use in detergent are disclosed in EP-B 0 070 077, 0 075 996 and 0 094 118.

Also suitable as nonionic surfactants are poly hydroxy fatty acid amide surfactants of the formula

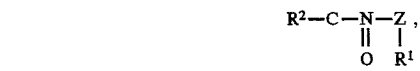

wherein $R^1$ is H, $C_{1-4}$ hydrocarbyl, 2-hydroxy ethyl, 2-hydroxy propyl or a mixture thereof, $R_2$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. Preferably, $R_1$ is methyl, $R_2$ is a straight $C_{11-15}$ alkyl or alkenyl chain such as coconut alkyl or mixtures thereof, and Z is derived from a reducing sugar such as glucose, fructose, maltose, lactose, in a reductive amination reaction.

A further class of surfactants are the semi-polar surfactants such as amine oxides. Suitable amine oxides are selected from mono $C_8$–$C_{20}$, preferably $C_{10}$–$C_{14}$ N-alkyl or alkenyl amine oxides and propylene-1,3-diamine dioxides wherein the remaining N positions are substituted by methyl, hydroxyethyl or hydroxypropyl groups.

Another class of surfactants are amphoteric surfactants, such as polyamine-based species.

Cationic surfactants can also be used in the detergent compositions herein and suitable quaternary ammonium surfactants are selected from mono $C_8$–$C_{16}$, preferably C10–$C_{14}$ N-alkyl or alkenyl ammonium surfactants wherein remaining N positions are substituted by methyl, hydroxyethyl or hydroxypropyl groups.

Mixtures of surfactant types are preferred, more especially anionic-nonionic and also anionic-nonionic-cationic mixtures. Particularly preferred mixtures are described in British Patent No. 2040987 and European Published Application No. 0 087 914. The detergent compositions can comprise from 1%–70% by weight of surfactant, but usually the surfactant is present in the compositions herein an amount of from 1% to 30%, more preferably from 10–25% by weight.

BUILDER

Builder materials will typically be present at from 10% to 60% of the detergent compositions herein. The compositions herein are free or substantially free of phosphate-containing builders (substantially free being herein defined to constitute less than 1% of the total detergent builder system), and the builder system herein consists of water-soluble builders, water-insoluble builders, or mixtures thereof.

Water insoluble builders can be an inorganic ion exchange material, commonly an inorganic hydrated aluminosilicate material, more particularly a hydrated synthetic zeolite such as hydrated Zeolite A, X, B or HS.

Preferred aluminosilicate ion-exchange materials have the unit cell formula $$M_z[(AlO_2)_z(SiO_2)_y]xH_2O$$

wherein M is a calcium-exchange cation, z and y are at least 6; the molar ratio of z to y is from 1.0 to 0.5 and x is at least 5, preferably from 7.5 to 276, more preferably from 10 to 264. The aluminosilicate materials are in hydrated form and are preferably crystalline containing from 10% to 28%, more preferably from 18% to 22% water. The above aluminosilicate ion exchange materials are further charaterized by a particle size diameter of from 0.1 to 10 micrometers, preferably from 0.2 to 4 micrometers. The term "particle size diameter" herein represents the average particle size diameter of a given ion exchange material as determined by conventional analytical techniques such as, for example, microscopic determination utilizing a scanning electron microscope. The aluminosilicate ion exchange materials are further characterized by their calcium ion exchange capacity, which is at least 200 mg equivalent of $CaCO_3$ water hardness/g of aluminosilicate, calculated on an anhydrous basis, and which generally is in the range of from 300 mg eq./g to 352 mg eq./g. The aluminosilicate ion exchange materials herein are still further characterized by their calcium ion exchange rate which is described in detail in GB-1,429,143.

Aluminosilicate ion exchange materials useful in the practice of this invention are commercially available and can be naturally occurring materials, but are preferably synthetically derived. A method for producing aluminosilicate ion exchange materials is discussed in U.S. Pat. No. 3,985,669. Preferred synthetic crystalline aluminosilicate ion exchange materials useful herein are available under the designation Zeolite A, Zeolite B, Zeolite X, Zeolite HS and mixtures thereof. In an especially preferred embodiment, the crystalline aluminosilicate ion exchange material is Zeolite A and has the formula $$Na_{12}[(AlO_2)_{12}(SiO_2)_{12}]xH_2O$$

wherein x is from 20 to 30, especially 27. Zeolite X of formula $Na_{86}$ $[(AlO_2)_{86}(SiO_2)_{106}]$–10 $0.276H_2O$ is also suitable, as well as Zeolite HS of formula $[Na_6[(AlO_2)_6(SiO_2)_6]7.5\ H_2O)$.

Another suitable water-insoluble, inorganic builder material is layered silicate, e.g. SKS-6 (Hoechst). SKS-6 is a crystalline layered silicate consisting of sodium silicate ($Na_2Si_2O_5$). The high $Ca^{++}/Mg^{++}$ binding capacity is mainly a cation exchange mechanism. In hot water, the material becomes more soluble.

The water-soluble builder can be a monomeric or oligomeric carboxylate chelating agent.

Suitable carboxylates containing one carboxy group include lactic acid, glycolic acid and ether derivatives thereof as disclosed in Belgian Patent Nos. 831,368, 821,369 and 821,370. Polycarboxylates containing two carboxy groups include the water-soluble salts of succinic acid, malonic acid, (ethylenedioxy) diacetic acid, maleic acid, diglycollic acid, tartaric acid, tartronic acid and fumaric acid, as well as the ether carboxylates described in German Offenlegenschrift 2,446,686, and 2,446,687 and U.S. Pat. No. 3,935,257 and the sulfinyl carboxylates described in Belgian Patent No. 840,623. Polycarboxylates containing three carboxy groups include, in particular, water-soluble citrates, aconitrates and citraconates as well as succinate derivatives such as the carboxymethyloxysuccinates described in British Patent No. 1,379,241, lactoxysuccinates described in Netherlands Application 7205873, and the oxypolycarboxylate materials such as 2-oxa-1,1,3-propane tricarboxylates described in British Patent No. 1,387,447.

Polycarboxylates containing four carboxy groups include oxydisuccinates disclosed in British Patent No. 1,261,829, 1,1,2,2-ethane tetracarboxylates, 1,1,3,3-propane tetracarboxylates and 1,1,2,3-propane tetracarboxylates. Polycarboxylates containing sulfo substituents include the sulfosuccinate derivatives disclosed in British Patent Nos. 1,398,421 and 1,398,422 and in U.S. Pat. No. 3,936,448, and the sulfonated pyrolysed citrates described in British Patent No. 1,082,179, while polycarboxylates containing phosphone substituents are disclosed in British Patent No. 1,439,000.

Alicyclic and heterocyclic polycarboxylates include cyclopentane-cis,cis,cis-tetracarboxylates, cyclopentadienide pentacarboxylates, 2,3,4,5-tetrahydrofuran—cis, cis, cis-tetracarboxylates, 2,5-tetrahydrofuran -cis—dicarboxylates, 2,2,5,5-tetrahydrofuran—tetracarboxylates, 1,2,3,4,5,6-hexane -hexacarboxylates and and carboxymethyl derivatives of polyhydric alcohols such as sorbitol, mannitol and xylitol. Aromatic polycarboxylates include mellitic acid, pyromellitic acid and the phtalic acid derivatives disclosed in British Patent No. 1,425,343.

Of the above, the preferred polycarboxylates are hydroxycarboxylates containing up to three carboxy groups per molecule, more particularly citrates.

Preferred builder systems for use in the present compositions include a mixture of a water-insoluble aluminosilicate builder such as zeolite A, and a water-soluble carboxylate chelating agent such as citric acid.

Other builder materials that can form part of the builder system for the purposes of the invention include inorganic materials such as alkali metal carbonates, bicarbonates, silicates, and organic materials such as the organic phosphonates, amino polyalkylene phosphonates and amino polycarboxylates.

Other suitable water-soluble organic salts are the homo- or co-polymeric acids or their salts, in which the polycarboxylic acid comprises at least two carboxyl radicals separated from each other by not more than two carbon atoms.

Polymers of this type are disclosed in GB-A-1,596,756. Examples of such salts are polyacrylates of MW 2000–5000 and their copolymers with maleic anhydride, such copolymers having a molecular weight of from 20,000 to 70,000, especially about 40,000.

OPTIONAL INGREDIENTS

The present compositions will typically include optional ingredients that normally form part of detergent compositions Antiredeposition and soil suspension agents, optical brighteners, bleaches, bleach activators, suds suppressors, anticacking agents, dyes and pigments are examples of such optional ingredients and can be added in varying amounts as desired.

Antiredeposition and soil suspension agents suitable herein include cellulose derivatives such as methylcellulose, carboxymethylcellulose and hydroxyethylcellulose, and homo- or co-polymeric polycarboxylic acids or their salts. Polymers of this type include the polyacrylates and maleic anhydrideacrylic acid copolymers previously mentioned as builders, as well as copolymers of maleic anhydride with ethylene, methylvinyl ether or methacrylic acid, the maleic anhydride constituting at least 20 mole percent of the copolymer. These materials are normally used at levels of from 0.5% to 10% by weight, more preferably from 0.75% to 8%, most preferably from 1% to 6% by weight of the composition.

Preferred optical brighteners are anionic in character, examples of which are disodium 4,4$^1$-bis-(2-diethanolamino-4-anilino -s- triazin-6-ylamino)stilbene-2:2$^1$ disulphonate, disodium 4, —4$^1$-bis-(2-morpholino-4-anilin-s-triazin-6-ylaminostilbene-2:2$^1$—disulphonate, disodium 4,4$^1$—bis-(2,4-dianilino-s-triazin-6-ylamino) stilbene-2:2$^1$—disulphonate, monosodium 4$^1$,4$^{11}$ -bis-(2,4-dianilino-s-triazin-6 ylamino)stilbene-2-sulphonate, disodium 4,4$^1$-bis-(2-anilino-4-(N-methyl-N-2-hydroxyethylamino)-s-triazin-6-ylamino)stilbene-2,2$^1$—disulphonate, disodium 4,4$^1$-bis-(4-phenyl-2,1,3-triazol-2-yl)-stilbene-2,2$^1$ disulphonate, disodium 4,4$^1$bis(2-anilino-4-(1-methyl-2-hydroxyethylamino-s-triazin-6-ylamino) stilbene-2,2$^1$disulphonate and sodium 2(stilbyl-4$^{11}$-(naphtho-1$^1$,2$^1$:4,5)-1,2,3 —triazole-2$^{11}$-sulphonate.

Any particulate inorganic perhydrate bleach can be used, in an amount of from 3% to 40% by weight, more preferably from 8% to 25% by weight and most preferably from 12% to 20% by weight of the compositions. Preferred examples of such bleaches are sodium perborate monohydrate and tetrahydrate, percarbonate, and mixtures thereof.

Another preferred separately mixed ingredient is a peroxy carboxylic acid bleaching agent and salts thereof, which is preferably added in a prilled or agglomerated form.

Peroxygen bleaching agents are preferably combined with bleach activators, which lead to the in situ production in aqueous solution (i.e. during the washing process of the peroxy acid corresponding to the bleach activator). Examples of suitable compounds of this type are disclosed in British Patent Nos. 1586769 and 2143231 and a method for their formation into a prilled form is described in European Published Patent Application No. 0 062 523. Preferred examples of such compounds are tetracetyl ethylene diamine and sodium 3, 5, 5 trimethyl hexanoyloxybenzene sulphonate.

Bleach activators are normally employed at levels of from 0.5% to 10% by weight, more frequently from 1% to 8% and preferably from 2% to 6% by weight of the composition.

Another optional ingredient is a suds suppressor, exemplified by silicones, and silica-silicone mixtures. Silicones can be generally represented by alkylated polysiloxane materials while silica is normally used in finely divided forms exemplified by silica aerogels and xerogels and hydrophobic silicas of various types. These materials can be incorporated as particulates in which the suds suppressor is advantageously releasably incorporated in a water-soluble or water-dispersible, substantially non-surface-active detergent impermeable carrier. Alternatively the suds suppressor can be dissolved or dispersed in a liquid carrier and applied by spraying on to one or more of the other components.

As mentioned above, useful silicone suds controlling agents can comprise a mixture of an alkylated siloxane, of the type referred to hereinbefore, and solid silica. Such mixtures are prepared by affixing the silicone to the surface of the solid silica. A preferred silicone suds controlling agent is represented by a hydrophobic silanated (most preferably trimethyl-silanated) silica having a particle size in the range from 10 millimicrons to 20 millimicrons and a specific surface area above 50 $m^2/g$ intimately admixed with dimethyl silicone fluid having a molecular weight in the range from about 500 to about 200,000 at a weight ratio of silicone to silanated silica of from about 1:1 to about 1:2.

A preferred silicone suds controlling agent is disclosed in Bartollota et al. U.S. Pat. No. 3,933,672. Other particularly useful suds suppressors are the self-emulsifying silicone suds suppressors, described in German Patent Application DTOS 2,646,126 published Apr. 28, 1977. An example of such a compound is DC-544, commercially availably from Dow Corning, which is a siloxane/glycol copolymer.

The suds suppressors described above are normally employed at levels of from 0.001% to 2% by weight of the composition, preferably from 0.01% to 1% by weight. The incorporation of the suds modifiers is preferably made as separate particulates, and this permits the inclusion therein of other suds controlling materials such as C20–C24 fatty acids, microcrystalline waxes and high MW copolymers of ethylene oxide and propylene oxide which would otherwise adversely affect the dispersibility of the matrix. Techniques for forming such suds modifying particulates are disclosed in the previously mentioned Bartolotta et al U.S. Pat. No. 3,933,672.

Other useful polymeric materials are the polyethylene glycols, particularly those of molecular weight 1000–10000, more particularly 2000 to 8000 and most preferably about 4000. These are used at levels of from 0.20% to 5% more preferably from 0.25% to 2.5% by weight. These polymers and the previously mentioned homo- or co-polymeric polycarboxylate salts are valuable for improving whiteness maintenance, fabric ash deposition, and cleaning performance on clay, proteinaceous and oxidizable soils in the presence of transition metal impurities.

Soil release agents useful in compositions of the present invention are conventionally copolymers or terpolymers of terephthalic acid with ethylene glycol and/or propylene glycol units in various arrangements. Examples of such polymers are disclosed in the commonly assigned U.S. Pat. Nos. 4,116,885 and 4,711,730 and European Published Patent Application No. 0 272 033. A particular preferred polymer in accordance with EP-A-0 272 033 has the formula $$(CH_3\ (PEG)_{43})_{0.75}(POH)_{0.25}[T\text{–}PO)_{2.8}(T\text{–}PEG)_{0.4}]T(PO\text{–}H)_{0.25}((PEG)_{43}CH_3)_{0.75}$$

where PEG is —$(OC_2H_4)O$—,PO is $(OC_3H_6O)$ and T is $(pcOC_6H_4CO)$.

Certain polymeric materials such as polyvinyl pyrrolidones typically of MW 5000–20000, preferably 10000–15000, also form useful agents in preventing the transfer of labile dyestuffs between fabrics during the washing process.

Fabric softening agents can also be incorporated into detergent compositions in accordance with the present invention. These agents may be inorganic or organic in type. Inorganic softening agents are exemplified by the smectite clays disclosed in GB-A-1,400,898. Organic fabric softening agents include the water-insoluble tertiary amines as disclosed in GB-A-1514276 and EP-B-0 011 340 and their combination with mono C12–C14 quaternary ammonium salts are disclosed in EP-B-0 026 527 and EP-B-0 026 528 and di-long-chain amides as disclosed in EP-B-0 242 919. Other useful organic ingredients of fabric softening systems include high molecular weight polyethylene oxide materials as disclosed in EP-A-0 299 575 and 0 313 146.

Levels of smectite clay are normally in the range from 5% to 20%, more preferably from 8% to 15% by weight with the material being added as a dry mixed component to the remainder of the formulation. Organic fabric softening agents such as the water-insoluble tertiary amines or di-long-chain amide materials are incorporated at levels of from 0.5% to 5% by weight, normally from 1% to 3% by weight whilst the high molecular weight polyethylene oxide materials and the water-soluble cationic materials are added at levels of from 0.1% to 2%, normally from 0.15% to 1.5% by weight. These materials are normally added to the spray dried portion of the composition, although in some instances it may be more convenient to add them as a dry mixed particulate, or spray them as a molten liquid on to other solid components of the composition.

MAKING PROCESS

Compositions according to the present invention can be made via a variety of methods including dry mixing, spray drying, agglomeration and granulation and combinations of any of these techniques.

PREFERRED MAKING PROCESS

A method of making the compositions herein involves a combination of spray drying, agglomeration in a high speed mixer and dry mixing.

A first granular component containing a relatively insoluble anionic surfactant is spray dried and part of the spray dried product is diverted and subjected to a low level of nonionic surfactant spray on before being reblended with the remainder. A second granular component is made by dry neutralisation of an anionic surfactant acid using sodium carbonate as the neutralising agent in a continuous high speed blender such as a Lodige KM mixer. The first and second components together with other dry mix ingredients such as the carboxylate chelating agent, inorganic peroxygen bleach, bleach activator, soil suspension agent, silicate and enzyme are then fed to a conveyor belt from which they are transferred to a horizontally rotating drum in which perfume and silicone suds suppressor are sprayed on to the product. In highly preferred compositions, a further drum mixing step is employed in which a low (approx. 2%) level of finely divided crystalline aluminosilicate is introduced to increase density and improve granular flow characteristics.

A preferred method of making the compositions according to the present invention is described in Applicants' copending European Patent Application No. 92.870.138.2 herewith incorporated by reference.

The present detergent compositions are in granular form and are characterized by their density, which is higher than the density of conventional detergent compositions. The density of the compositions herein ranges from 800 to 1100 g/liter, preferably 850 to 1000 g/liter of composition, measured at 20° C.

The "compact" form of the compositions herein is best reflected, in terms of composition, by the amount of inorganic filler salt; inorganic filler salts are conventional ingredients of detergent compositions in powder form; In conventional detergent compositions, the filler salts are present in substantial amounts, typically 17–35% by weight of the total composition.

In the present compositions, the filler salt is present in amounts not exceeding 15% of the total composition, preferably not exceeding 10%, most preferably not exceeding 5% by weight of the composition.

Inorganic filler salts, such as meant in the present compositions are selected from the alkali and alkaline-earth-metal salts of sulphates and chlorides.

A preferred filler salt is sodium sulphate.

PROCESS OF WASHING

The compact detergent compositions herein have the ability to achieve the same efficiency than conventional detergent compositions, when a considerably lesser amount of composition herein, is used in the main wash cycle of a washing machine.

Accordingly, in an other embodiment of the invention, it is herewith provided for a process for washing fabrics in a washing machine wherein an amount of from 15 to 170 g of a detergent composition according to the present invention is used for the main wash cycle.

Typically, under European conditions, the recommended usage is from 80 to 140 g of detergent composition for the main wash cycle, without the need of a pre-wash.

The detergent compositions herein are preferably delivered directly to the drum and not indirectly via the outer casing of the machine. This can most easily be achieved by incorporation of the composition in a bag or container from which it can be released at the start of the wash cycle in response to agitation, a rise in temperature or immersion in the wash water in the drum. Such a container will be placed in the drum, together with the fabrics to be washed. Alternatively the washing machine itself may be adapted to permit direct addition of the composition to the drum e.g. by a dispensing arrangement in the access door.

Products comprising a detergent composition enclosed in a bag or container are usually designed in such a way that container integrity is maintained in the dry state to prevent egress of the contents when dry, but are adapted for release of the container contents on exposure to a washing environment, normally on immersion in an aqueous solution.

Usually the container will be flexible, such as a bag or pouch. The bag may be of fibrous construction coated with a water impermeable protective material so as to retain the contents, such as is disclosed in European published Patent Application No. 0 018 678. Alternatively it may be formed of a water insoluble synthetic polymeric material provided with an edge seal or closure designed to rupture in aqueous media as disclosed in European published Patent Application Nos. 0 011 500, 0 011 501, 0 011 502, and 0 011 968. A convenient form of water frangible closure comprises a water soluble adhesive disposed along and sealing one edge of a pouch formed of a water impermeable polymeric film such as polyethylene or polypropylene.

In a variant of the bag or container product form, laminated sheet products can be employed in which a central flexible layer is impregnated and/or coated with a composition and then one or more outer layers are applied to produce a fabric-like aesthetic effect. The layers may be sealed together so as to remain attached during use or may separate on contact with water to facilitate the release of the coated or impregnated material.

An alternative laminate form comprises one layer embossed or deformed to provide a series of pouch-like containers into each of which the detergent components are deposited in measured amounts, with a second layer overlying the first layer and sealted thereto in those areas between the pouch-like containers where the two layers are in contact. The components may be deposited in particulate, paste or molten form and the laminate layers should prevent egress of the contents of the pouch-like containers prior to their addition to water. The layers may separate or may remain attached together on contact with water, the only requirement being that the structure should permit rapid release of the contents of the pouch-like containers into solution. The number of pouch-like containers per unit area of substrate is a matter of choice but will normally vary between 500 and 25,000 per square meter.

Suitable materials which can be used for the flexible laminate layers in this aspect of the invention include, among others, sponges, paper and woven and non-woven fabrics.

However the preferred means of carrying out the washing process according to the present invention includes the use of a reusable dispensing device having walls that are permeable to liquid but impermeable to the solid composition.

Devices of this kind are disclosed in European Patent Application Publication Nos. 0 343 069 and 0 344 070. The latter Application discloses a device comprising a flexible sheet in the form of a bag extending from a support ring defining an orifice, the orifice being adapted to admit to the bag sufficient product for one washing cycle in a washing cycle. A portion of the washing medium flows through the orifice into the bag, dissolves the product, and the solution then passes outwardly through the orifice into the washing medium. The support ring is provided with a masking arrangement to prevent egress of wetted, undissolved, product, this arrangement typically comprising radially extending walls extending from a central boss in a spoked wheel configuration, or a similar structure in which the walls have a helical form.

The following examples illustrate the invention and facilitate its understanding.

EXAMPLE I and II

The following compositions are made.

Compact granular detergent: examples I and II.

Example I

| | |
|---|---|
| Linear alkyl benzene sulphonate sodium salt | 8.0 |
| $C_{45}$ alkyl sulphate sodium salt | 2.5 |
| $C_{45}$ alcohol 7 times ethoxylated | 6.0 |
| Tallow alcohol 11 times ethoxylated | 2.0 |
| Layered silicate | 15.0 |
| Trisodium citrate | 5.0 |
| Carbonate sodium salt | 6.5 |
| Zeolite | 15.0 |
| Maleic acid acrylic acid copolymer | 5.0 |
| DETMPA | 0.3 |
| Savinase ™ 10T | 0.8 |
| Lipolase ™ 100T | 0.25 |
| Sodium silicate | 2.0 |
| Sodium sulphate | 3.5 |
| PVP | 1.0 |
| Perborate | 15.0 |
| TAED | 6.0 |
| Minors | up to 100 |

Example II

| | |
|---|---|
| Surfactants | |
| C45 alkyl sulphate sodium salt | 8.0 |
| Linear C12–15 3 times ethoxylated | 6.0 |
| Builders | |
| Zeolite | 20.0 |
| Citrate | 6.0 |
| Buffer | |
| Carbonate | 16.0 |
| Polymer | |
| CMC | 0.4 |
| Maleic acid acrylic acid copolymer | 5.0 |
| Enzyme | |
| Savinase 10T | 1.2 |
| Lipolase 150T | 0.10 |
| Miscellaneous | |
| perborate | 20.0 |
| TAED | 6.0 |
| Minors | up to 100 |

We claim:

1. A highly concentrated granular detergent composition comprising:

(a) less than 20 g/L detergent composition of enzyme granulates, wherein the enzyme granulates in said highly concentrated detergent composition comprise enzyme granulates having at least 2% of protease enzyme; and (b) detergent composition ingredients selected from the group consisting of detersive surfactants, builders, bleaches, bleach activators, and mixtures thereof;

and wherein further said highly concentrated detergent composition has a density of at least about 800 g/L and a Hunter Whiteness value of greater than 66.5.

2. A highly concentrated granular detergent composition according to claim 1 wherein $TiO_2$ is added to the enzyme granulates.

3. A highly concentrated granular detergent composition according to claim 9 wherein the Hunter Whiteness value of the detergent composition is at least 78.9.

* * * * *